United States Patent Office 3,072,687
Patented Jan. 8, 1963

3,072,687
PROCESS FOR THE MANUFACTURE OF 9:11-UNSATURATED STEROIDS
Albert Wettstein, Riehen, and Karl Heusler, Charles Meystre, Niklaus Tarkoey, and Peter Wieland, Basel Switzerland, assignors to Ciba Corporation, a corporation of Delaware
No Drawing. Filed Dec. 23, 1959, Ser. No. 861,446
Claims priority, application Switzerland Dec. 24, 1958
11 Claims. (Cl. 260—397.45)

This invention relates to a new process for the manufacture of 9:11-unsaturated steroids from 11α-hydroxysteroids.

The steroids unsaturated in 9:11-position are important intermediate products for the manufacture of highly active 9α-halogen-11β-hydroxy-steroids, for example for the manufacture of 9α-fluoro-11β-hydroxy-methyl-testosterone, 9α-fluoro-hydrocortisone, 9α-fluoro-prednisolone, 9α-fluoro-16α-methylhydrocortisone, 9α-fluoro-16α-methyl-prednisolone and so on.

It is true that various processes are already known for the splitting off of 11α-hydroxyl groups in pregnanes and androstanes, for example, by the action of bromosuccinimide and subsequent treatment with sulfur dioxide in pyridine, by the action of phosphorus oxychloride in pyridine, by the production of sulfonic acid esters, for example tosylates or mesylates and subsequent splitting with the aid of various alkaline agents, for example with sodium acetate in dioxane, acetone, alcohols, dimethylformamide or glacial acetic acid, or even with alcohols alone or in the presence of strong bases such as potassium hydroxide.

For the splitting off of 11α-sulfonic ester groups, however, organic bases have also been used, primarily collidine, and also aluminum oxide. It has been found however, that the crude splitting products obtained by the specified processes, are very difficult to purify since they contain certain quantities of secondary products which probably constitute double bond isomers of the desired 9:11-unsaturated compounds. These secondary products (which may contain the double bond, for example, in 11:12-position) have such similar physical properties to the desired 9:11-unsaturated compounds, that their separation by recrystallization or by distribution between two phases can only be carried out with large losses such as are inadmissible for industrial production of really pure 9:11-unsaturated steroids. Hitherto, therefore, in most cases for the industrial conversion into 9:11-halohydrins products have been used still containing more or less large quantities of the said secondary products, as a result of which the yields in the further treatment of these products were notably lower than with the use of highly purified 9:11-unsaturated intermediate products.

In the process of the present invention, from the corresponding 11α-sulfonic acid esters, 9:11-unsaturated steroids can be produced in excellent yield which are entirely free from disturbing secondary products. According to the process of the invention the splitting off takes place extraordinarily rapidly and is often complete at a temperature of 70–90° C. in less than 1 hour. It is therefore not necessary to use elevated temperatures, which are disadvantageous for operation on an industrial scale. The process consists in that a sulfonic acid ester of an 11α-hydroxysteroid is heated under anhydrous conditions in a basic solvent with a lithium halide, if desired in the presence of an alkali metal or alkaline earth metal carbonate.

As basic solvent are used more especially tertiary aromatic bases such as pyridine, collidine etc., or also dialkylformamides, for example dimethylformamide. Of the lithium halides, lithium chloride and lithium bromide are most advantageous. As alkali metal carbonates, which serve to neutralize the sulfonic acid formed, for example lithium carbonate, potassium carbonate, sodium bicarbonate or calcium carbonate is used.

The sulfonic acid esters used as starting materials, for example, p-toluene sulfonic acid ester, benzene sulfonic acid ester, p-chlorobenzene sulfonic acid ester, methane, ethane or propane sulfonic acid ester, are derived from 11α-hydroxyl compounds of the androstane, pregnane, spirostane, cholestane or ergostane series. They may contain further free or esteified hydroxyl groups or free or ketalized oxo groups, and also double bonds, for example in 1- and/or 4-position. As more important starting materials may be mentioned, for example, sulfonic acid esters of: 11α-hydroxy-17α-methyl-testosterone, 11α-hydroxy-1-dehydro-17α-methyltestosterone, 11α-hydroxy-testosterone, 11α-hydroxy-1-dehydro-testosterone, 11α-hydroxy-progesterone, 11-epicorticosterone and its 21-esters, 11-epihydrocortisone and its 21-esters, 11-epiprednisolone and its 21-esters, 11α:17α:21-trihydroxy-16α-methyl-allopregnane-3:20 - dione and its 21-esters, Δ⁴-11α:17α:21-trihydroxy-16α-methyl-pregnene-3:20-dione and its 21-esters, Δ¹-11α:17α:21-trihydroxy-16α-methyl-allopregnene-3:20-dione and its 21-esters and Δ¹˙⁴-11α:17α:21-trihydroxy-16α-methyl-pregnadiene-3:20-dione and its 21-esters.

The following examples illustrate the invention:

Example 1

1.0 gram of 11α-hydroxy-17α-methyl-testosterone is dissolved in 10 ml of pyridine. The solution, cooled to 0° C. is treated with 1.0 ml. of methane sulfochloride and the reaction mixture allowed to stand for 6 hours at 0° C. The light yellow solution is then poured on ice and extracted with ethyl acetate. The extracts are washed with N-hydrochloric acid, water, dilute sodium carbonate solution and with water, dried and evaporated under vacuum. 11α-mesyloxy-17α-methyl-testosterone is obtained as a colorless crystalline residue.

The mesylate thus produced is dissolved in an anhydrous 10% solution of lithium chloride in dimethylformamide and the whole heated for 2 hours on a water bath. The cooled reaction mixture is diluted with ether and washed with dilute hydrochloric acid, with water, dilute sodium carbonate solution and again with water. The aqueous solutions are extracted with ether and the combined ether solutions dried and evaporated. A crystalline residue is obtained, which according to paperchromatographic analysis consists of pure 9:11-dehydromethyl-testosterone. The pure product of M.P. 168–169° C. is prepared by recrystallization from ether.

Example 2

9.0 grams of 11α-tosyloxy-17α-methyl-testosterone of M.P. 143–144° C. are dissolved in 45 ml. of absolute pyridine and, after the addition of 3.0 grams of anhydrous lithium chloride the whole boiled under reflux for 30 minutes in a nitrogen atmosphere. After cooling to room temperature dilution is carried out with a mixture of 400 ml. of water, 195 ml. of methanol and 48 ml. of concentrated hydrochloric acid and the resulting crystal suspension is left to stand for 2 hours at 0° C. The light yellow crystals are then filtered with suction, washed with water and the residue dried in a water jet vacuum at 60° C. 5.20 grams of 9:11-dehydro-17α-methyl-testosterone of M.P. 163–165° C. are obtained. By a single recrystallization from acetone, the pure product of M.P. 168–169° C. is easily obtained therefrom.

Example 3

To a solution of 1.0 gram of 11α:17α-dihydroxy-16α- methyl-21 acetoxy-allopregnane-3:20-dione in 8.0 ml. of methylene chloride and 2.0 ml. of pyridine are added 900 mg. of p-toluene sulfochloride and the mixture allowed to stand for 20 hours at room temperature. The product is then diluted with methylene chloride, washed several times with N-hydrochloric acid and with water and the organic solutions dried and evaporated in a water jet vacuum. By crystallization of the residue from methylene chloride-ether, 1.10 grams are obtained of 11α-tosyloxy-17α-hydroxy-16α-methyl - 21-acetoxy-allopregnane - 3:20-dione o° M.P. 145–147° C. (with decomposition).

637 mg. of this tosylate are heated in 7 ml. of dimethylformamide containing about 10% of anhydrous lithium chloride, for 2 hours to 80° C. After a short time the reaction product begins to separate in crystalline form. The whole is diluted with 70 ml. of water and the crystals are filtered with suction and washed with water. By recrystallization from acetone-methylene chloride-ether, 454 mg. are obtained of pure $\Delta^{9(11)}$-16α-methyl-17α-hydroxy-21-acetoxy-allopregnene-3:20-dione of M.P. 216–224° C.

Example 4

To a solution of 1.0 gram of pure 11α:17α-dihydroxy-16α-methyl-21-acetoxy-allopregnane-3:20-dione in 8.0 ml. of methylene chloride and 2.0 ml. of pyridine is added 0.5 ml. of methane sulfochloride and the solution allowed to stand for 16 hours at 0° C. The whole is then diluted with methylene chloride, washed with dilute hydrochloric acid and with water and the various aqueous solutions extracted several times with methylene chloride. The dried methylene chloride solutions are evaported and freed from excess of methane sulfochloride under a pressure of 0:05 mm. 1.20 grams of 11α-methane-sulfonyloxy-16α-methyl-17α-hydroxy-21-acetoxy-allopregnane-3:20 - dione are obtained as a colorless foam.

The crude mesylate is dissolved in 10 ml. of an anhydrous 10% solution of lithium chloride in dimethyl-formamide and the whole heated for 2 hours to 80° C. On cooling, the reaction product crystallizes out in part. The precipitation is completed by addition of 60 ml. of water and the deposit is filtered with suction and the residue after washing with water dried under vacuum over phosphorus pentoxide. 999 mg. are obtained of $\Delta^{9(11)}$-16α-methyl-17α-hydroxy-21-acetoxy-allopregnane-3:20 - dione of M.P. 218–220° C.

Example 5

To a solution of 3.46 grams of $\Delta^{1:4}$-11α:17α-dihydroxy 16α-methyl-21-acetoxy-pregnadiene-3:20-dione in 35 cc. of pyridine are added with stirring and cooling with an ice-common salt mixture, 3 cc. of methane sulfochloride and the whole is then allowed to stand for 6 hours at 0° C. It is then poured into 130 cc. of ice cold N-hydrochloric acid and the whole extracted 3 times with a mixture of ethyl acetate-ether (2:1). The organic solutions are washed with 100 cc. of N-hydrochloric acid, 100 cc. of water, 50 cc. of 0.5 N-sodium carbonate solution and then with water. This is followed by drying and evaporation in a water jet vacuum at a bath temperature of 30° C. and the residue is dried at 40° C. under high vacuum. After recrystallization from a methylene chloride-ether mixture with the addition of 150 mg. of animal carbon and filtration there are obtained 3.48 grams of $\Delta^{1:4}$-11α-mesyloxy - 16α-methyl - 17α - hydroxy - 21-acetoxy - pregnadiene-3:20-dione of decomposition point about 178° C.

1.155 grams of $\Delta^{1:4}$-11α-mesyloxy-16α-methyl-17α-hydroxy-21-acetoxy-pregnadiene-3:20-dione and 1.2 grams of lithium carbonate are stirred in a stream of nitrogen for 2 hours with 15 cc. of a 10% solution of lithium chloride in dimethylformamide at a bath temperature of 120° C. After cooling, 100 cc. of methylene chloride are added followed by extraction three times with 100 cc. of water and the aqueous solutions are extracted by shaking with 2 further quantities of 100 cc. each of methylene chloride. The whole is then evaporated under a water jet vacuum and the residue treated with xylene, evaporation under vacuum repeated and this operation carried out twice further. The residue is crystallized from a methylene chloride-ether mixture after decolorization with 50 mg. of animal carbon, whereby 858 mg. of $\Delta^{1:4:9(11)}$-16α-methyl-17α-hydroxy-21-acetoxy-pregnatriene - 3:20-dione are obtained in the form of weak yellow-colored crystals. After further recrystallization it melts at 211.5–215° C. Ultra-violet spectrum in methanol:

$$\epsilon_{239m\mu} = 15300$$

Infra-red spectrum in methylene chloride: 2.75μ (hydroxyl); 5.70μ (acetate); 5.75μ (20-ketone); 5.98μ (3-ketone); 6.12μ ($\Delta^4$); 6.19μ ($\Delta^1$) and 8.13μ (acetate). When the mesylate splitting is carried out without addition of lithium carbonate, a much more strongly colored triene is obtained in smaller yield.

Example 6

905 mg. of 3:20-dioxo-11α:17α-dihydroxy-16α-methyl-21-acetoxy-allopregnane are dissolved in 9 cc. of pyridine. The solution is cooled to 0° C. and 0.9 cc. of methanesulfonic acid chloride is added and the whole allowed to stand for 6 hours at that temperature and then poured on to ice. The resulting suspension is extracted with a 1:2-mixture of ethyl acetate and ether. The ethyl acetate and ether solution is washed with dilute hydrochloric acid, water, dilute sodium carbonate solution and water, dried and evaporated under reduced pressure, 1.354 grams of amorphous 3:20-dioxo-11α-mesyloxy-16α-methyl-17α-hydroxy-21-acetoxy-allopregnane being obtained as residue. This residue is mixed with 9 cc. of anhydrous 10% lithium chloride solution in dimethyl formamide. The resulting solution is heated for 2 hours under nitrogen on a boiling water bath, diluted with methylene chloride, the methylene chloride solution washed with dilute hydrochloric acid, water, dilute sodium carbonate solution and water, dried and evaporated under reduced pressure. The resulting 1.007 grams of residue are dissolved in a mixture of acetone and methylene chloride and recrystallized. 767 mg. of $\Delta^{9(11)}$-3:20-dioxo-16α-methyl-17α-hydroxy-21-acetoxy-allopregnane melting at 216–224° C. are obtained. Optical rotation:

$$[\alpha]_D^{27.3} = +72.4°$$

(c=1.2434 in chloroform); infrared spectrum: bands inter alia at 2.76μ, 5.70μ, 5.77μ (shoulder), 5.82μ, 7.24μ (shoulder), 7.30μ, 8.75μ, 9.40μ, 9.55μ and 10.20μ.

From the mother liquors a little more of the same compound with a somewhat lower melting point can be obtained.

What is claimed is:

1. Process for the manufacture of pure 9:11-unsaturated steroids from sulfonic acid esters of 9-unsubstituted-11α-hydroxy-steroids, wherein a sulfonic acid ester is heated under anhydrous conditions in a basic solvent with a lithium halide.

2. Process as claimed in claim 1, wherein the heating is carried out in the presence of a compound selected from the group consisting of an alkali metal and alkaline earth metal carbonate.

3. Process as claimed in claim 1, wherein lithium chloride is used.

4. Process as claimed in claim 1, wherein dimethyl-formamide is used as solvent.

5. Process as claimed in claim 1, wherein pyridine is used as solvent.

6. Process as claimed in claim 1, wherein lithium carbonate is added.

7. Process as claimed in claim 1, wherein 11α-tosyloxy-17α-methyl-testosterone is used as starting material.

8. Process as claimed in claim 1, wherein 11α-tosyloxy-17α-hydroxy-21-acetoxy-16α-methyl-allopregnane - 3:20-dione is used as starting material.

9. Process as claimed in claim 1, wherein 11α-mesyloxy-17α-hydroxy-21-acetoxy-16α-methyl-allopregnane-3:20-dione is used as starting material.

10. Process as claimed in claim 1, wherein Δ$^{1,4}$-11α-mesyloxy-17α-hydroxy-21-acetoxy-16α-methyl-pregnadiene-3:20-dione is used as starting material.

11. Process as claimed in claim 1, wherein Δ$^{1,4}$-11α-tosyloxy-17α-hydroxy-21-acetoxy-16α-methyl-pregnadiene-3:20-dione is used as starting material.

References Cited in the file of this patent

UNITED STATES PATENTS

| | | |
|---|---|---|
| 2,842,568 | Herz et al. | July 8, 1958 |
| 2,851,455 | Fried et al. | Sept. 9, 1958 |
| 2,982,850 | Fried et al. | June 30, 1959 |
| 2,930,804 | Fried | Mar. 29, 1960 |

FOREIGN PATENTS

| | | |
|---|---|---|
| 809,114 | Great Britain | Feb. 18, 1959 |